April 10, 1945. C. V. SMITH 2,373,201
AUTOMATIC PRESS SYSTEM FOR FORMING RESINOUS DISKS
Filed Feb. 24, 1941 2 Sheets-Sheet 1

Inventor
CHARLES V. SMITH,
Attorneys

April 10, 1945.   C. V. SMITH   2,373,201
AUTOMATIC PRESS SYSTEM FOR FORMING RESINOUS DISKS
Filed Feb. 24, 1941   2 Sheets-Sheet 2
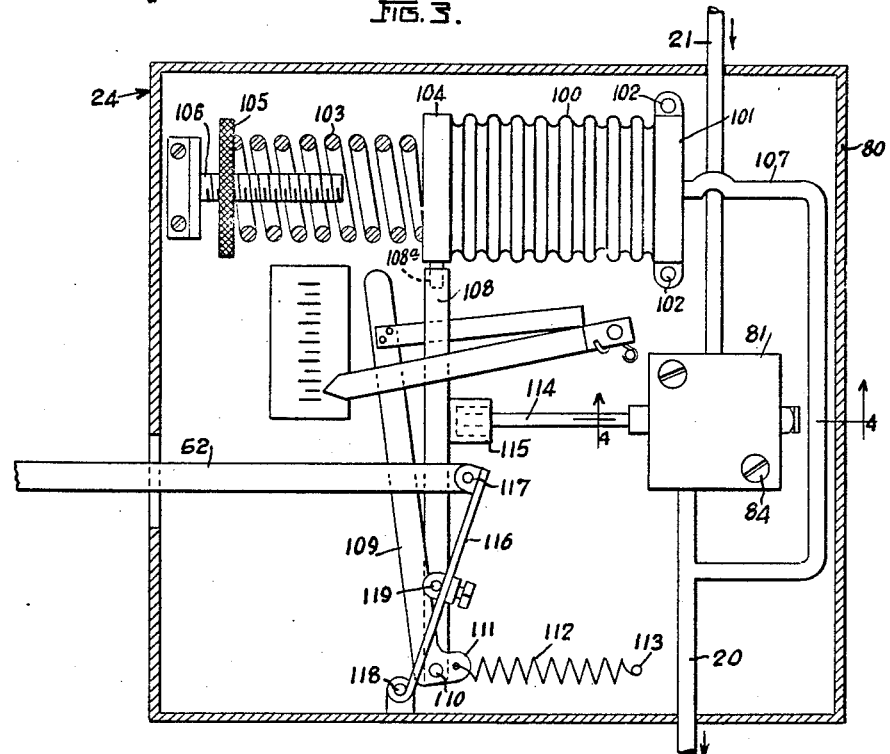
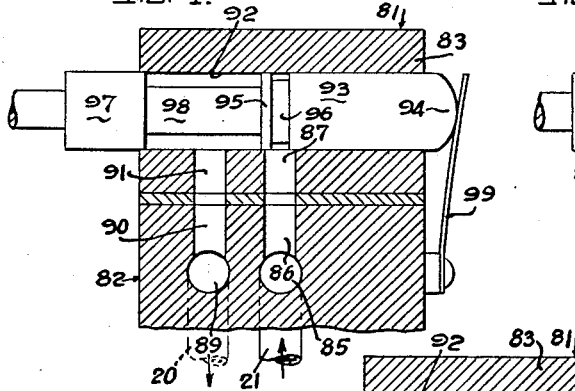
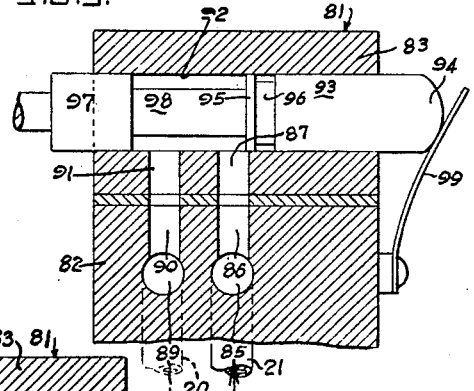
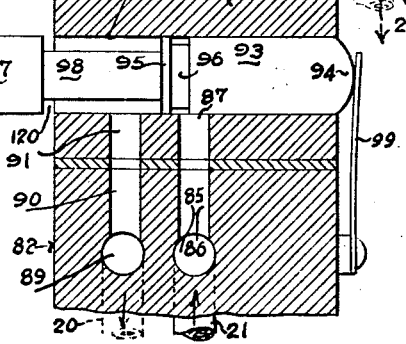

Patented Apr. 10, 1945

2,373,201

UNITED STATES PATENT OFFICE 2,373,201

AUTOMATIC PRESS SYSTEM FOR FORMING RESINOUS DISKS

Charles V. Smith, Dayton, Ohio, assignor to The Univis Lens Company, Dayton, Ohio, a corporation of Ohio Application February 24, 1941, Serial No. 380,149

11 Claims. (Cl. 18—17)

This invention relates to a forming press for shaping masses of synthetic resin, and more particularly relates to an operating system for such a press.

When it is desired to alter the shape of a solidified mass of a synthetic resin it is desirable that the resin be heated sufficiently that it can bend or be deformed without causing the same to have mechanical failure. While the elimination of mechanical failure is the only requirement necessary when forming or pressing a solidified mass of resinous material, when producing common articles of commerce, yet there are other internal failures accompanying such pressing or forming operations which are not perceptible to the eye.

In order to produce optical articles from a solidified mass of plastic material, it is necessary that the original properties of the material be retained. There are certain synthetic plastic materials, such as Plastiglas, Lucite, Crystallite and others, which are organic resins produced by the polymerization of the monomeric derivatives of acrylic and methacrylic acids, which are acceptable for use in forming optical articles such as lenses, and more particularly ophthalmic lenses.

In order to produce high grade optical articles from synthetic plastic materials it is necessary that the various steps in forming or shaping the article by the pressing method shall be accomplished under accurate control. It is also required that the pressing or deforming of a blank or mass of plastic material shall not be deformed or shaped at too great a rate of deformation. If a mass of resinous material is formed into a lens, and the forming is carried out at too rapid a rate, there is an internal disorder which produces an internal stress which alters the index of refraction of the material thereby displacing the optical paths through the same. These strains can be termed "optical strains" since they are of insufficient value to cause any mechanical difficulty in the material and are imperceptible to the eye. They are only noticeable when the material is used as a lens, the optical path displacement showing up very definitely under such conditions.

It is therefore an object of this invention to provide a forming press, and a system for operating the same, which will mechanically form an optical article at a predetermined rate of deformation wherein the heating and cooling cycle of the mass of resinous material is automatically controlled.

It is another object of the invention to provide a forming press in accordance with the foregoing object wherein the spaced relationship of the platens of the forming press determines the end of the heating and forming cycle for a mass of resinous material.

It is another object of the invention to provide a forming press in accordance with the foregoing objects wherein the spaced relationship of the platens of the press determines the end of the heating cycle for the material and initiates the cooling cycle.

It is still another object of the invention to provide a heating and cooling system for a forming press in which a mass of plastic material is formed, wherein the flow of the cooling medium is controlled by the presence or absence of the heating medium in the system.

It is another object of the invention to provide a heating and cooling system for a forming press in accordance with the foregoing object wherein the heating and cooling fluids are under pressure, and wherein the pressure of the heating fluid prevents circulation of the cooling fluid during the heating cycle of the press.

It is another object of the invention to provide a forming press for producing optical articles wherein the desired thickness of an optical article controls the ending of a forming and heating cycle and initiates a cooling cycle.

It is still a further object of the invention to provide a forming press for producing optical articles in accordance with the foregoing object wherein the press performs the forming operation automatically.

It is another object of the invention to provide a semi-automatic forming press for producing optical articles.

It is another object of the invention to provide a forming press for producing optical articles from plastic materials which is accurately controlled by a pressure regulating device.

It is still another object of the invention to provide a forming press in accordance with the foregoing object wherein the pressure regulating device is actuated by a timing mechanism.

It is another object of the invention to provide a pressure regulating valve for accurately actuating the platens of a press and for controlling the pressure applied thereby upon an article formed between the platens.

It is another object of the invention to provide a time controlled pressure control regulating mechanism for accurately controlling the pressure applied to the pressure mechanism of a forming press.

Further objects and advantages will be apparent from the drawings and the following description.

In the drawings:

Figure 3 is a cross-sectional view of a somewhat diagrammatic showing of a pressure regulating valve for controlling pressure applied to the forming press.

Figure 4 is a cross-sectional view taken along line 4—4 of Figure 3 showing the control valve of the pressure regulating device in the closed position.

Figure 5 is a similar view of the valve of Figure 4 but arranged in the open position.

Figure 6 is a view similar to Figure 4, but showing the valve in the position for bleeding pressure from the pressure operating mechanism of the press.

Figure 1:
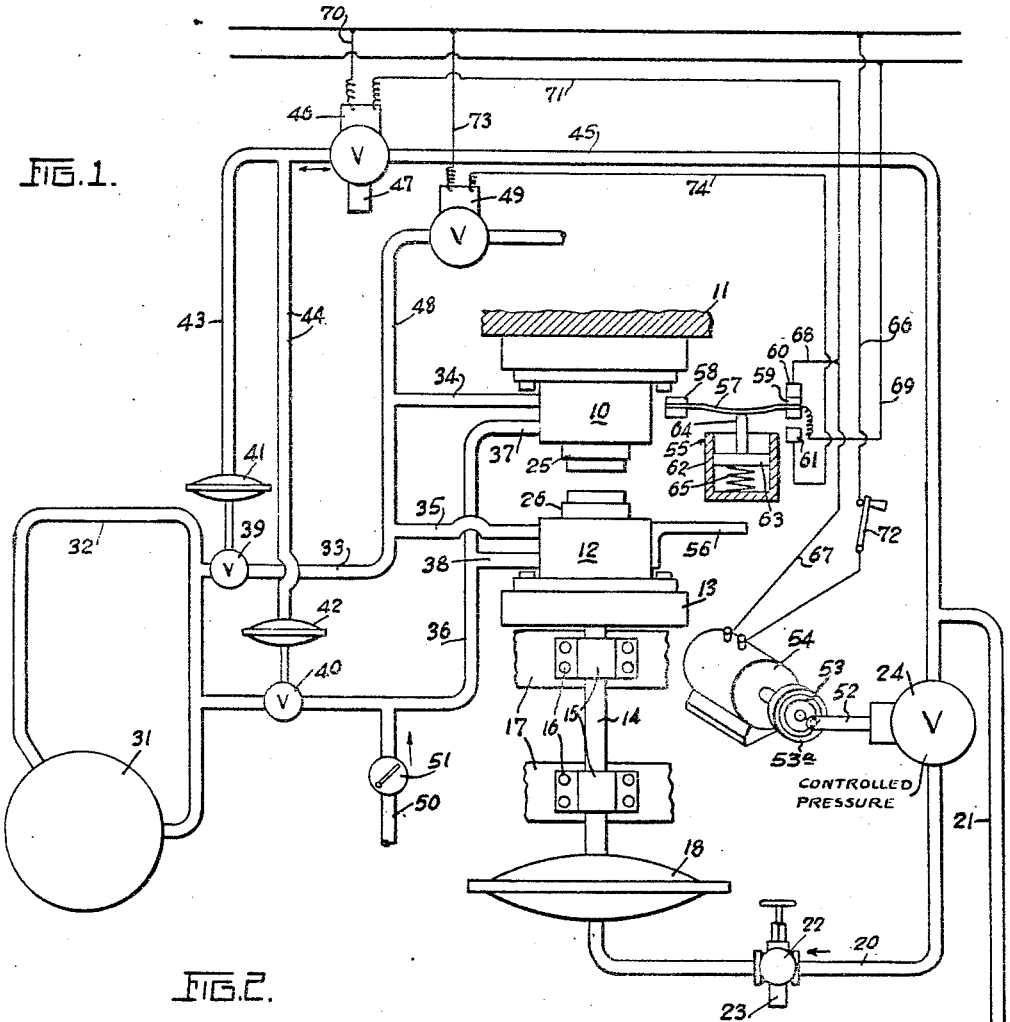
Figure 1 is a diagrammatic view of a press and operating system associated therewith for performing the operation of this invention.

In this invention the forming press consists of a platen 10 carried upon a stationary head 11, and a platen 12, carried upon a movable head 13, which head 13 is carried by a pillar 14. The pillar 14 is journaled in the bearings 15 which are secured by means of the bolts 16 to the stationary support 17. The head 13 is carried upon the upper end of the pillar 14 while the lower end thereof is connected to a diaphragm motor 18. The diaphragm motor 18 is connected to a source of fluid pressure, such as the fluid reservoir 19, by means of the conduits 20 and 21. A manually controlled 3-way valve 22 is positioned in the conduit 20 for controlling the flow of fluid pressure from the fluid storage tank 19 to the diaphragm motor 18. The valve 22 can be operated to permit the flow of fluid pressure to the motor 18, or can exhaust the pressure from the motor 18 by way of the exhaust conduit 23.

A fluid pressure regulating or control valve 24 is positioned in the conduit 20 and is located between the fluid pressure storage tank 19 and the hand operated valve 22. This pressure control valve 24 is operated to gradually increase the pressure upon the diaphragm motor 18 for expanding the same and thus to close the platens 10 and 12, thus closing the die halves 25 and 26.

The press just described is a simple form of press mechanism since the pressures involved, when producing lenses from resinous material, are not high. The diaphragm motor 18 is well suited for applying sufficient pressure between the die halves 25 and 26 for accomplishing the desired forming of a blank of resinous material placed therebetween.

Figure 2:
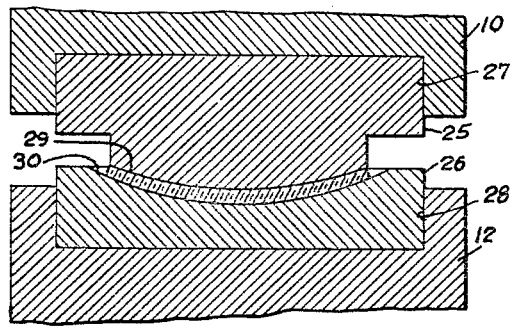
Figure 2 is a cross-sectional view of a pair of forming dies adapted to be associated with the forming press for producing a lens.

The die halves 25 and 26 are carried by the platens 10 and 12 in any suitable manner but, as shown in Figure 2, the die halves can be carried within the recesses 27 and 28 provided in the platens 10 and 12 respectively. Suitable means can be provided for removably positioning the die halves 25 and 26 in the recesses 27 and 28 respectively, to permit removal and insertion of various cooperating pairs of die elements. As shown in Figure 2, the die halves 25 and 26 are provided with cooperating die surfaces 29 and 30 respectively which are of the desired surface curvature for producing a lens from a mass of resinous material positioned therebetween, the surfaces being arranged to cooperate with one another to produce a lens having the desired surface curvature. The surfaces 29 and 30 of the die halves 25 and 26 are finished to the desired perfection which will impart a surface finish upon the mass of resinous material suitable for optical use.

The platens 10 and 12 are provided with passages suitable for the circulation of a heating or a cooling fluid therethrough. To provide a source of fluid heat for circulation through the passages in the platens 10 and 12 a steam boiler 31 is provided. This boiler can be heated by any suitable source of heat for maintaining the steam loop 32 filled with live steam. It is of course to be understood that the steam boiler 31 represents any source of fluid heat which can be arranged for circulation through the passages provided in the platens 10 and 12.

A conduit 33 connects the upper portion of the steam loop 32 with the inlet conduits 34 and 35 connected to the platens 10 and 12 respectively. A steam return conduit 36 is connected to the platens 10 and 12 respectively by means of the conduits 37 and 38. The conduit 36 connects with the lower portion of the steam loop 32 for return of condensed steam to the steam boiler 31. While the present description refers to steam as the heating fluid for circulation through the platens of the press, it can readily be understood that any other fluid can be used for circulation through the platens for heating the same to any desired temperature. The steam loop 32 provides means whereby steam at a constant temperature is available for circulation through the conduits 33, 34 and 35, and will be of a more even temperature than if the conduit connecting the steam source with the conducting conduits 33, 34 and 35 would be a dead end conduit.

To control the circulation of the steam through the conduits 33 and 36 shut-off valves 39 and 40 respectively are placed in the conduits. These fluid flow control valves 39 and 40 are operated by means of the diaphragm motors 41 and 42 respectively. The motors 41 and 42 are connected by means of the conduits 43 and 44 respectively to the conduit 45, which latter conduit is connected with the conduit 21 leading from the fluid pressure source 19. A 3-way solenoid valve is positioned in the conduit 45 between the pressure source 19 and the diaphragm motors 41 and 42. The solenoid valve 46 when energized is adapted to open to permit fluid pressure to pass from the conduit 45 into the conduits 43 and 44 for operating the diaphragm motors 41 and 42. When the solenoid valve 46 is deenergized the conduit 45 is closed while the valve 46 connects the conduits 43 and 44 with an exhaust conduit 47.

An exhaust conduit 48 is connected to the conduit 33 and in which there is positioned a fluid flow control valve 49, which valve is normally closed when deenergized. The valve 49 provides means for exhausting pressure from the conduits 33, 34, 35 and 36 during a certain portion of the cycle of operation of the forming press, which will be hereinafter described.

During a certain portion of the cycle of operation of the forming press a cooling fluid is circulated through passages in the platens 10 and 12. The heating and cooling passages in the platens may be independent passages or can be a common set of passages. As disclosed in Figure 1, both the heating and cooling medium circulates through the same set of passages. A conduit 50 connects the conduit 36 with a source of cooling fluid which is under pressure. A unidirectional flow check valve 51 is positioned in the conduit 50 and controls the flow of cooling fluid into the conduit 36. The check valve 51 is adapted to open for the passage of fluid in the direction of the arrow indicated adjacent the conduit 50, the check valve closing against return flow of fluid.

The check valve 51 is adapted to be closed by the pressure of the heating fluid when heating fluid under pressure is present in the conduit 36, the pressure of the heating fluid overcoming the pressure of the cooling fluid to close the check valve 51 and thus prevent circulation of cooling fluid through the conduit 36 as long as heating fluid is present therein and is under pressure.

To control the rate at which the pressure will be increased within the diaphragm motor 18, for moving the die half 26 against the die half 25, the valve or pressure regulator 24 is gradually opened to permit increasing pressure to pass therethrough into the conduit 20. The pressure regulating valve 24 is provided with an actuating arm 52 which engages a cam track 53 provided in a disk 53a mounted on the shaft of a timing motor 54. The shape of the cam track 53 is pre-designed to open the valve 24 and permit fluid pressure to pass therethrough at a predetermined rate of increase, which rate of increase has been pre-determined to govern the rate of forming a mass of resinous material placed between the die halves 25 and 26. As previously mentioned the rate at which a mass of resinous material can be formed to produce an optical article of high perfection must be accurately controlled to prevent the development of optical strain in the article. The rate at which the article is formed is governed also by the temperature of the article during the forming process. The rate of forming and the temperature at which the article is held during the forming is coordinated to produce a formed article which will be substantially free of optical strain. To accomplish the given rate of formation the contour of the cam track 53 must be pre-designed in order to open the valve 24 at the proper rate to permit passage of fluid pressure to the diaphragm motor 18 at the proper rate.

The pressure regulating valve 24 consists of a casing 80 within which there is secured a plunger valve 81 which controls the passage of air pressure from the supply line 21 to the conduit 26 which interconnects the valve 24 with the diaphragm motor 18. The plunger valve 81 has a lower body portion 82 and an upper body portion 83 which are secured together by means of the screws 84. The lower body portion 82 has a horizontal bore 85 which extends partly through the body portion 82 and communicates with a vertical bore 86. The vertical bore 86 communicates with a vertical bore 87 provided in the upper body portion 83. These bores 85, 86 and 87 provide the inlet passage communicating with the pressure conduit 21. A similar horizontal bore 88 is provided in the lower valve body portion 82 which extends partially through the body and communicates with a vertical bore 90. The vertical bore communicates with a vertical bore 91 provided in the upper body portion 83. The bores 89, 90 and 91 provide the discharge passage from the valve 81 connecting with the discharge conduit 20.

A bore 92 extends horizontally through the upper body portion 83 and forms the cylinder within which a plunger or piston 93 is adapted to reciprocate. The plunger 93 has an end portion 94 which fits the bore 92, which end portion 94 is separated from an annular collar portion 95 by means of an annular undercut portion 96. The annular collar portion 95 is separated from an end portion 97 by means of an annular undercut portion 96. The portions 94, 95 and 97 are of equal diameter for engaging the bore 92 in a piston-like relation. A leaf spring 99 urges the plunger 93 in a leftward direction, as viewed in Figures 4, 5 and 6. A mechanism for actuating the plunger 93 in response to the pressure within the diaphragm motor 18 consists of a Sylphon bellows 100 which has one end thereof secured to a stationary mounting member 101, which member is secured to the casing 80 by means of the screws or bolts 102. The opposite end of the Sylphon 100 is engaged by a compression spring 103 which has one end thereof in engagement with the closure member 104 for the Sylphon, and the opposite end thereof in engagement with an adjusting collar 105. The collar 105 is threaded upon a stationarily mounted stud 106 for altering the degree of compression of the spring 103. A conduit 107 is secured to the mounting 101 and communicates with the interior of the Sylphon 100. The opposite end of the conduit 107 communicates with the discharge conduit 20 from the valve member 81 and thus conducts the pressure from the discharge conduit 20 to within the Sylphon 100.

The Sylphon bellows 100 actuates the plunger 93 through means of a lever arm 108, which is loosely carried upon a pin 108a secured to the end portion 104 of the Sylphon bellows. The pin 108a thus becomes a pivot for the loosely mounted lever arm 108. The opposite end of the lever arm 108 engages a lever arm 109 and is connected thereto by means of the pivot pin 110. The lever arm 108 has an extending ear 111 to which there is connected one end of a tension spring 112, the opposite end of the tension spring being secured to a pin 113 fastened in the body of the casing 80.

The plunger 93 has a stem portion 114 which extends into engagement with a cup member 115 fastened upon the lever arm 108, whereby movement of the lever arm 108 actuates the plunger 93 through the stem portion 114.

In addition to the Sylphon bellows actuating the plunger 93 a mechanism interconnects the plunger 93 with the time controlled actuating cam 53 and consists of the actuating arm 52, one end of which engages the cam track 53 provided in the cam disk 53a. The opposite end of the actuating arm 52 is connected to a lever 116 by means of a pivot pin 117. The lever arm 116 is pivotally carried upon a wall of the casing 80 by means of the pivot pin 118. The arm 116 engages the arm 109 through means of an actuating pin 119, which pin is adjustably carried upon the arm 116 for longitudinal adjustment thereupon to vary the leverage between the arm 116 and the arm 109.

The regulating valve 24 just described provides a very accurate control mechanism for regulating the pressure applied to the diaphragm motor 18. When the cam disk 53a is driven by the timing motor 54, the actuating arm 52 will be moved in a rightward direction, as viewed in Figure 3, whereby the arm 116 will be pivoted about the pivot point 118 to permit the lever arm 108 to be moved in a rightward direction about the fulcrum pin 108a by means of the spring 112.

This movement is accomplished through the pivot pin 110 which interconnects the lever 109 with the lever arm 108. Movement of the lever arm 109 by means of the actuating arm 52 permits a corresponding movement of the lever arm 108. When the lever arm 108 is moved in a rightward direction, as viewed in Figure 3, the plunger extension 114 actuates the plunger 93 in a rightward direction whereby the collar 95 opens the bore 87 to the annular ring 98 around the plunger 93, and thus air pressure from the conduit 21 can pass from the bore 87 to the bore 91 to the conduit 20. Pressure in the conduit 20 will then be present in the conduit 107 to apply pressure to the Sylphon bellows 100. According to the compression of the spring 103 the bellows 100 will be moved in a leftward direction to move the end wall 104 thereof and thus the pin 108a. Movement of the pin 108a in a leftward direction permits the arm 108 to move in a leftward direction as fulcrumed about the pivot pin 110 whereby the plunger 93 is moved in a leftward direction by means of the leaf spring 99 to close the bore 87 from communication with the bore 91. The collar 95 on the plunger 93 is at this time between the bores 87 and 91.

If the pressure increase in the conduit 20 has been just sufficient to be balanced by the compression spring 103 the previous result will be obtained. However, if the pressure in the conduit 20 should rise above the compression spring 103 the bellows 100 will expand in a leftward direction until the lever arm 108 has permitted sufficient movement of the plunger 93 in a leftward direction that the portion 97 of the plunger leaves the bore 92. Such a position is indicated in Figure 6. In this position the bore 91 is open to the atmosphere through the port 120 provided by removal of the plunger portion 97 from the bore 92. Air can then escape from the conduit 20 through the bores 90 and 91 and the port 120 to the atmosphere and the pressure in the Sylphon bellows 100 is reduced to a point balanced by the spring 103 that the plunger portion will again re-enter the bore 92, and close the port 120.

As previously described, the cam track 53 in the disk 53a has a predetermined contour for gradually moving the actuating arm 52 in a rightward direction, as viewed in Figure 3, whereby an increasing pressure is required in the bellows 100 to offset the increased opening attempted to be made by the cam disk 53a. This increase in pressure actuates the diaphragm motor 18 to operate the forming press. Since the contour of the cam track 53 is predetermined to produce a predetermined rate of pressure increase over a predetermined time interval, it can readily be seen that the regulating valve 24 provides a very accurate control over the pressure applied to the diaphragm motor 18.

A microlimit switch 55 is positioned adjacent the platens 10 and 12 and is adapted to be operated by an arm 56 extending from the movable platen 12. The microlimit switch 55, which is shown diagrammatically in Figure 1, consists of a leaf spring 57 which is rigidly mounted at one end thereof, as indicated at 58. The center portion of the leaf spring 57 is formed arcuately and is so arranged that when pressure is applied to the arcuate portion thereof the spring 57 will snap over center in the manner of the well known cricket spring. The free end of the leaf spring 57 carries a contact 59 which is adapted to engage a contact 60 when in one position or a contact 61 when in the opposite position. The device for operating the leaf spring 57 consists of a cup member 62 within which there is mounted a piston 63 carrying an extending rod 64, the piston 63 being slidable within the cup shaped member 62. A spring 65 is positioned between the piston 63 and the cup shaped member 62. The cup shaped member 62 is so positioned with respect the press platen 12 that the arm 56 can engage the cupped member 62 for moving the rod 65 into engagement with the arcuate portion of the leaf spring 57.

The microlimit switch 55 is adjustably positioned with respect the platens 10 and 12 to permit the spaced relationship of the platens to be varied before the limit switch becomes effective. Since the limit switch is operated by a very slight movement, the switch becomes a means for accurately controlling the spaced relationship of the die halves 25 and 26, and thus determines the thickness of a lens formed therebetween.

Since all of the resinous materials, from which optical articles are made, have large coefficients of expansion, considerable contraction thereof occurs when they are cooled after the forming operation. It is required that the die surfaces shall be in constant engagement with the surfaces of the optical article being formed to produce an optical article of high perfection. It is therefore necessary for the movable die half 26 to follow up the contraction of the mass of resinous material positioned between the two die halves the forming pressure in the diaphragm motor 18 providing such action. The spring 65, in the limit switch 55, is provided to permit the platen 12 to move the cup 62 slightly after the limit switch 55 has snapped into the opposite position from that shown in Figure 1, the spring 65 thus preventing damage to the delicate mechanism of the limit switch during the follow up period of the press.

The limit switch 55 controls concomitant operation of the timing motor 54 and the solenoid 46. An electric circuit is established for the timing motor 54 through the lines 66, 67 and 68, the contacts 60 and 59 and the line 69. At the same time an electric circuit is established for the solenoid valve 46 by means of the lines 70, 71, the contacts 60 and 59 and the line 69. It may thus be seen that the solenoid valve 46 is energized concomitantly with energization of the timing motor 54 when the limit switch 55 is in the position with the contacts 59 and 60 closed. A hand switch 72 is provided in the electric circuit for the timing motor 54.

When the limit switch 55 is in position with the contacts 59 and 61 closed electric circuit is established for the solenoid valve 49 through the lines 73, 74 and 69, the circuit at this time being broken through the solenoid valve 46 and the timing motor 54.

The cycle of operation for the press when forming an optical article from a mass of resinous material, and particularly when forming lenses of a high degree of perfection is as follows: When starting a cycle of operation the press and the operating mechanism is as shown in Figure 1. At this time the solenoid valve 46 is open so that pressure from the fluid storage reservoir 19 is applied to the diaphragm motors 41 and 42, whereby the valves 39 and 40 are open. Steam from the boiler 31 is circulating through the conduits 33, 34 and 35 to the platens 10 and 12 respectively, the steam pressure is present in the conduits 37, 38 and 36, thus completing the steam circuit through the platens. The presence of steam pressure in the conduit 36 closes the check valve 59 to prevent cooling fluid from entering the conduit 36, it being understood for this purpose that the steam pressure in the conduit 36 is above the pressure of the cooling fluid in the conduit 50. The check valve 51 is of an ordinary swing type which is closed by the differential of pressure on the two sides thereof.

The platens 10 and 12 are thus being heated as well as the die halves 25 and 26. It will be understood that at this time the manual control valve 22 has been turned to open the exhaust conduit 23 so that no pressure is existing in the diaphragm motor 18 whereby the die halves 25 and 26 are permitted to remain in the open position as shown in Figure 1.

Sufficient heating time is given the die halves 25 and 26 to bring them up to a desirable temperature after which a mass of resinous material is positioned upon the die half 26. If an ophthalmic lens is to be formed the mass of resinous material can be in the form of a disk of suitable thickness, which can either be a flat disk or can be preformed to a slight extent with substantially the surface curvature of the die halves 25 and 26.

The cam 53 on the timing motor 54 is set manually so that the actuating arm 52 of the valve 24 will close the valve 24. The valve 22 may now be operated to close the exhaust conduit 23 and to open the through connection in the conduit 20 thereby establishing communication between the valve 24 and the diaphragm motor 18. The hand switch 72 is now closed whereupon the timing motor 54 is started. Initial rotation of the cam opens the valve 24 slightly whereupon pressure from the fluid pressure reservoir 19 is conducted to the diaphragm motor 18. It will be understood, however, that at this time the pressure in the conduit 20 and the diaphragm motor 18 is just sufficient to close the die half 26 against the die half 25 and to place a very slight pressure upon the lens blank positioned therebetween. This initial pressure is retained within the diaphragm motor for a predetermined interval of time, the time interval being determined by the rotation of the cam 53, the contour of the face of the cam being shaped in such a manner that the initial position of the valve 24 is retained for whatever determined period of time desired. During this period steam is circulating through the platens 10 and 12 whereby the lens blank, positioned between the die halves 25 and 26, is brought to a desirable molding or forming temperature.

After rotation of the cam through the predetermined interval of time, as determined by the timing motor 54, the contour of the cam 53 will then effect a gradual increase in the opening of the valve 24, whereby the pressure in the conduit 20 and the diaphragm motor 18 will gradually increase. The increasing pressure within the diaphragm motor 18 will cause the die half 26 to move toward the die half 25 and thereby form the lens blank positioned therebetween to the configuration of the face surfaces 29 and 30 of the respective die halves. As previously mentioned the rate of this formation is determined by the contour of the cam 53 since the contour of this cam determines the rate of opening of the valve 24 and thus the rate of pressure increase in the diaphragm motor 18.

Upon the die halves 25 and 26 reaching a predetermined spaced relationship, which spaced relationship determines the thickness of the lens formed therebetween, the arm 56 will engage the microlimit switch 55 to cause the leaf spring 57 to snap over center and break engagement with the contact 60 and make contact with contact 61.

When electric circuit is broken through contacts 59 and 60 the timing motor 54 and the solenoid valve 46 are deenergized, whereby the pressure in the diaphragm motor 18 is prevented from further increase since the valve 24 will not be open any further and will hold the pressure at this point. The solenoid valve 46 will close the through passage from the conduit 45 and will open an exhaust passage 47 whereby the pressure in the diaphragm motors 41 and 42 will be released to the atmosphere, thereby closing the valves 39 and 40.

At the instant electric circuit was broken through contacts 59 and 60, electric circuit was made between contacts 59 and 61 whereby the valve 49 was energized to open the exhaust conduit 48. When the exhaust conduit 48 is opened steam pressure existing in the conduits 33, 34, 35, 36, 37 and 38 is exhausted to the atmosphere. This release of pressure in these conduits, and particularly in conduit 36, permits the pressure of the cooling fluid in the conduit 50 to open the check valve 51 and pass therethrough into the conduit 36. The cooling fluid will then pass from the conduit 36 to the conduits 37 and 38 into the platens 10 and 12 respectively, and will discharge therefrom through the conduits 34 and 35 and the exhaust conduit 48.

The heating of the lens blank brought the same to a state of plasticity sufficient to permit forming thereof at a predetermined rate as governed by the cam 53. The establishment of the cooling circuit just described will reduce the temperature of the die elements 25 and 26 to reestablish a normal temperature in the lens blank. During this cooling the blank will shrink considerable, as heretofore mentioned. However, the pressure in the diaphragm motor 18 is maintained whereupon the die half 26 will follow the shrinkage of the lens blank and retain the same in engagement with the faces 29 and 30 of the respective die halves. As previously described, the spring 65 of the microlimit switch 55 permits movement of the operating arm 56 with respect the limit switch 55 during follow up to prevent damage to the delicate mechanism thereof.

The circulation of cooling fluid in this circuit is maintained until the valve 22 is manually operated to establish connection between the diaphragm motor 18 and the exhaust 23, whereupon pressure is released from the diaphragm motor to permit separation of the platen 12 from the platen 10. It will be understood that the cooling portion of the cycle of operation of the press is determined according to the experience of an operator who will know when it is time to open the die halves 25 and 26 for removal of a lens formed therein.

When the platen 12 separates from the platen 10, the leaf spring 57, of the micro-limit switch 55, will snap to its normal position, as indicated in Figure 1, to reestablish electric circuit between the contacts 59 and 60. Reestablishment of this electric circuit again opens the solenoid valve 46 which in turn permits pressure to be applied to the diaphragm motors 41 and 42 to reopen the valves 39 and 40. Breaking of electric circuit between contacts 59 and 61 deenergized the solenoid 49 to close the exhaust conduit 48. The heating circuit is thus reestablished to the platens 10 and 12, the pressure then building up in the conduit 36 to close the check valve 51 and prevent the cooling fluid from entering the conduit 36.

At the time the manually operated valve 22 is opened the hand switch 12 is also opened so that the timing motor 54 is now inoperative for further actuation of the valve 24. The press is now in condition for the beginning of the next cycle of operation which can be repeated as previously described.

While the form and embodiment herein described is a preferred form, yet it will be understood that I desire to comprehend within the scope of my invention all modifications falling within the purview of my invention.

Having thus fully described my invention, what I claim as new and desire to secure by Letters Patent is:

1. A heating and cooling system for a forming press that exclusively heats or cools the platens of the press alternately comprising a source of heating fluid, a source of cooling fluid, means connecting said sources to the platens of a forming press, fluid flow control means disposed in the means connecting said source of heating fluid to the platens for completely stopping the flow of heating fluid to the platens when closed, and fluid flow control means disposed in the means connecting said source of cooling fluid to the platens for completely stopping the flow of cooling fluid to the platens when closed responsive to the presence of heating fluid in the means connecting said sources to the platens for closing said cooling fluid flow control means when heating fluid is present within said means connecting said sources to the platens.

2. A heating and cooling system for a forming press that exclusively heats or cools the platens of the press alternately comprising a pressure source of heating fluid, a pressure source of cooling fluid, means connecting said sources to the platens of a forming press, fluid flow control means disposed in the means connecting said source of heating fluid to the platens for completely stopping the flow of heating fluid to the platens when closed, and fluid flow control means disposed in the means connecting said source of cooling fluid to the platens for completely stopping the flow of cooling fluid to the platens when closed responsive to the pressure of the heating fluid in the means connecting said sources to the platens for completely closing said cooling fluid flow control means when heating fluid is present within said means connecting said sources to the platens.

3. A heating and cooling system for a forming press that exclusively heats or cools the platens of the press alternately comprising a pressure source of heating fluid, a pressure source of cooling fluid having a lower pressure than said source of heating fluid, means connecting said sources to the platens of a forming press, fluid flow control means disposed in the means connecting said source of heating fluid to the platens for completely stopping the flow of heating fluid to the platens when closed, and a pressure operated fluid control means disposed in the means connecting said source of cooling fluid to the platens and exposed to the pressure of said heating fluid and said cooling fluid, said pressure of said heating fluid completely overcoming the pressure of the cooling fluid to close said cooling fluid flow control means and maintain the same closed as long as heating fluid is present in the means connecting said sources to the platens.

4. A heating and cooling system for a forming press to regulate the finished thickness of a product formed in the press by controlling the heating and cooling of the press platens comprising a pressure source of heating fluid, a pressure source of cooling fluid having a lower pressure than said source of heating fluid, means connecting said sources to the platens of a forming press, fluid flow control means disposed in the means connecting said source of heating fluid to the platens for completely stopping the flow of heating fluid to the platens when closed, and a pressure operated fluid control means disposed in the means connecting said source of cooling fluid to the platens and exposed to the pressure of said heating fluid and said cooling fluid, said pressure of said heating fluid completely overcoming the pressure of the cooling fluid to close said cooling fluid flow control means and maintain the same closed as long as heating fluid is present in the means connecting said sources to the platens, means responsive to a predetermined spaced relationship of the platens of the forming press which indicates a predetermined thickness of the material being formed in the press while in a softened condition under the influence of the heat of the platens for actuating said heating fluid flow control means to completely close the same, said cooling fluid flow control means immediately responding to the reduction in pressure of the heating fluid in said conducting means to open said control means and produce a rapid chilling of the platens of the press to harden the material therein and thus prevent further compression of the material.

5. A heating and cooling circulatory system for a forming press to regulate the finished thickness of a product formed in the press by controlling the heating and cooling of the press platens comprising conduit means for conducting a heating or cooling fluid under pressure to the platens of a forming press, a pressure source of heating fluid, a pressure source of cooling fluid having a lower pressure than said source of heating fluid, a flow control valve associated with said conduit means controlling the flow of said heating fluid through said conduit means for completely stopping the flow of heating fluid to the platens when closed, a pressure operated flow control valve associated with said conduit means controlling the flow of cooling fluid through said conduit means and exposed simultaneously to the pressure of said heating and cooling fluids, said cooling fluid flow control valve being retained in closed position by the greater pressure of the heating fluid in said conducting conduit at all times when said heating fluid flow control valve is open, means for controlling the opening and closing of said heating fluid flow control valve, an exhaust conduit connected to said conducting conduits, means in said exhaust conduit for opening and closing the same, and means actuated by a predetermined spaced relationship of the platens of the forming press which indicates a predetermined thickness of the material being formed in the press while in a softened condition under the influence of the heat of the platens to actuate said heating fluid valve controlling means for closing said heating flow control valve and opening said exhaust valve whereby pressure of said heating fluid is exhausted from said conducting conduits and said cooling fluid flow control valve immediately responds to the reduced pressure in said conducting means to open upon exhaustion of heating fluid pressure whereby cooling fluid is admitted to said conducting conduits to completely purge the heating fluid therefrom through said exhaust conduit and produce a rapid chilling of the platens of the press to harden the material therein and thus prevent further compression of the material.

6. An operating system for a forming press to regulate the finished thickness of a product formed in the press by controlling the heating and cooling of the press platens and the application of pressure upon the platens including pressure operated means for closing the platens of a press, means for supplying pressure to said pressure operated means, means controlling the delivery of pressure to said pressure operated means to control the rate of pressure increase thereon, conduit means for conducting a heating or a cooling fluid to the platens of a press, a pressure source of heating fluid, a pressure source of cooling fluid having a lesser pressure than said heating fluid source, flow control means controlling the flow of said heating fluid from said source for completely stopping the flow of heating fluid to the platens when closed, means for controlling opening and closing of said flow control means, unidirectional flow control means controlling the flow of the cooling fluid from the source thereof for completely stopping the flow of cooling fluid to the platens when closed, said last mentioned control means being subject simultaneously to the pressure of said fluids and being closed by the pressure differential between said fluids when said heating fluid flow control is open, means controlling exhaust of fluid from said platens, and means actuated by a predetermined spaced relation of the platens of the press which indicates a predetermined thickness of the material being formed in the press while in a softened condition under the influence of the heat of the platens for actuating said pressure controlling means to stop delivery of any further increase of pressure to said pressure operated means, for actuating said heating fluid flow control controlling means to close the same and actuate said means controlling exhaust of fluid from the platens of the press whereby said cooling fluid flow control means opens immediately for flow of cooling fluid into the platens to purge the heating fluid therefrom and produce a rapid chilling of the platens of the press to harden the material therein and thus prevent further compression of the material.

7. A method of operating a forming press in which material softened by heat is placed to compress the material therein to a predetermined thickness by controlling the temperature of the press platens and the pressure thereon which consists of circulating a heating fluid through the press platens to soften material therebetween, of applying a gradually increasing pressure upon the platens to form an article from the material positioned therebetween, of stopping the increasing application of pressure upon the press platens and holding the level thereof constant upon the same reaching a predetermined spaced relationship indicating a predetermined thickness of the material being formed and of simultaneously therewith stopping the circulation of heating fluid through the press platens and initiating circulation of a cooling fluid to immediately chill the platens and the material therebetween to stop further formation thereof by the pressure retained thereon.

8. A method of operating a forming press in which material softened by heat is placed to compress the material therein to a predetermined thickness by controlling the temperature of the press platens and the pressure thereon which consists of circulating a heating fluid through the press platens to soften material therebetween, of applying a gradually increasing pressure upon the platens to form an article from the material positioned therebetween, of stopping the increasing application of pressure upon the press platens and holding the level thereof constant upon the same reaching a predetermined spaced relationship indicating a predetermined thickness of the material being formed and of simultaneously therewith stopping the circulation of heating fluid through the press platens and initiating circulation of a cooling fluid through the press platens to immediately chill the platens and the material therebetween to stop further formation thereof by the pressure retained thereon, of releasing pressure on the press platens to permit same to open, of reestablishing the flow of heating fluid to the platens concomitant with initial opening movement of the platens, and of stopping the circulation of cooling fluid to the press platens by the reestablishment of the circulation of heating fluid thereto.

9. A press for forming a solidified mass of resinous material to a predetermined thickness by controlling the heating and cooling of the platens and the pressure applied thereupon comprising platens arranged for movement toward and away from each other, pressure operated means for closing said platens, means for slowly applying increasing pressure to said pressure operated means over a prolonged interval of time, conduit means connected to said platens for conducting a heating fluid to and from said platens having fluid flow control means therein, conduit means associated with said first mentioned conduit means for conducting a cooling fluid thereto and having fluid flow control means therein actuated by the flow of heating fluid in said first mentioned conduit means, and means associated with said platens responsive to a predetermined spaced relationship thereof for causing concomitant operation of said pressure applying means and said heating fluid flow control means to halt increased application of pressure and flow of heating fluid to said platens, said cooling fluid flow control means opening upon halting of flow of heating fluid to said platens to chill said platens and prevent further formation of the material therein by the pressure retained thereon.

10. A press for forming a solidified mass of resinous material to a predetermined thickness by controlling the heating and cooling of the platens and the pressure applied thereupon comprising platens arranged for movement toward and away from each other, pressure operated means for closing said platens, means for slowly applying increasing pressure to said pressure operated means over a prolonged period of time, conduit means connected to said platens for conducting a heating fluid under pressure to and from said platens having fluid flow control means therein, an exhaust conduit having fluid flow control means therein associated with said conduit means, conduit means associated with said first mentioned conduit means for conducting a cooling fluid thereto and having fluid flow control means therein operated by the pressure of the heating fluid in said first mentioned conduit means, and means associated with said platens responsive to a predetermined spaced relationship thereof for concomitantly operating said pressure applying means, said heating fluid flow control means and said exhaust control means to halt increased application of pressure upon said platens, stop the flow of heating fluid and release the pressure of the heating fluid in said first mentioned conduit means, said release of pressure in said first mentioned conduit means actuating said cooling fluid flow control to open same to admit cooling fluid to said platens and immediately purge the heating fluid therefrom.

11. A press for forming resinous material comprising platens arranged for movement toward and away from each other, pressure operated means for closing said platens, a source of fluid pressure, valve means for controlling the flow of pressure from said source to said pressure operated means to slowly increase the pressure thereon, a timing motor, cam means driven by said timing motor and associated with said valve means for slowly increasing the degree of opening of said valve means upon operation of said cam, and means responsive to a predetermined spaced relationship of said platens for stopping said timing motor to hold said valve at the degree of opening attained and hold the pressure attained at a constant level.

CHARLES V. SMITH.